Aug. 16, 1966  N. P. SKINNER  3,266,620
CONVEYOR CHAINS
Filed Jan. 24, 1964  2 Sheets-Sheet 2
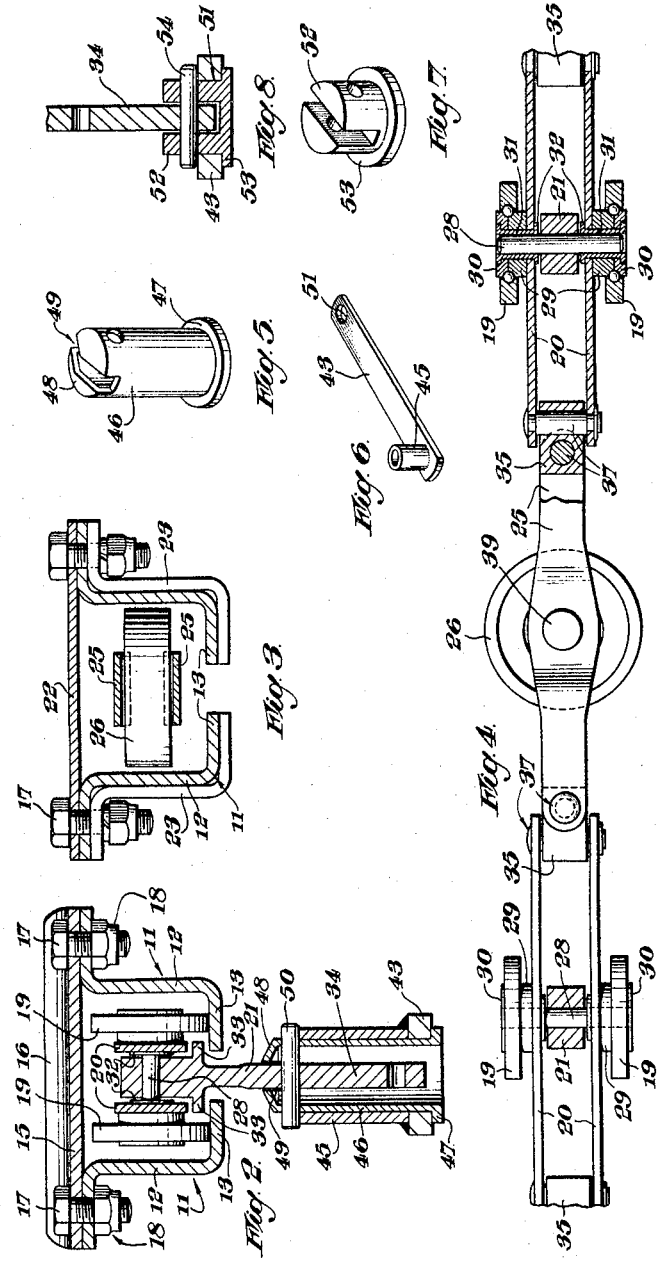

3,266,620
CONVEYOR CHAINS
Norman Philip Skinner, Four Trees, River Hill, Flamstead, St. Albans, Hertfordshire, England
Filed Jan. 24, 1964, Ser. No. 340,045
Claims priority, application Great Britain, Feb. 8, 1963, 5,162/63
2 Claims. (Cl. 198—177)

This invention relates to chain conveyors and, more particularly, to the construction of the chain and the suspension link arrangement by which the loads are suspended from the chain.

The invention consists of a chain for a chain conveyor comprising alternate carrier links and guide links coupled together by hinge blocks, each carrier link comprising a pair of bars spaced apart by the said hinge blocks engaged at its ends and having hinge pins passing through the blocks and the bars, a spindle passing through the centres of the bars, a pair of wheels carried on the spindle disposed outside the bars and adapted to run on the conveyor track, and a suspension link depending from the spindle between the bars, the suspension link having a lower portion of rectangular cross-section for supporting a load, each guide link comprising a pair of bars separated at their ends by the said hinge blocks and having hinge pins passing through the hinge blocks and the bars, the bars being inwardly cranked at their central portions to narrow the space therebetween, the hinge pins in the guide links being at right-angles to the hinge pins in the carrier links, a spindle passing through the cranked centres of the bars, a wheel carried on the spindle adapted to rotate about a vertical axis and, by contact with the sides of the conveyor track, to guide the chain laterally.

Preferably the suspension links have stop portions projecting outwardly from their sides adapted to engage the bars of the respective carrier link if the carrier link should tend to swing beyond a predetermined angle with respect to the line of movement of the chain.

For carrying heavy loads couplings bars may be provided adapted to engage the suspension links of two adjacent carrier links, each coupling bar comprising a yoke bar to carry the load, a tubular member attached to the yoke bar, the yoke bar having a hole in line with the bore of the tube, a bush rotatable in the tubular member, and a pin passing laterally through the bush and the suspension link, the yoke bar being formed with a hole at its other end through which a clevis member is inserted and retained by a pin passing through the two sides of the clevis and the suspension link of the associated carrier link.

To promote a clear understanding of the invention an example thereof will now be described with reference to the accompanying drawings in which:

FIGURE 2 is a transverse section through a conveyor track and the chain, the section being taken through one of the carrier links;

FIGURE 3 is a similar section to that of FIGURE 2 but taken through one of the guide links;

FIGURE 4 is a plan view of part of a chain according to the invention; and

FIGURES 5, 6, 7 and 8 are details of the load carrying arrangement.

Figure 1:
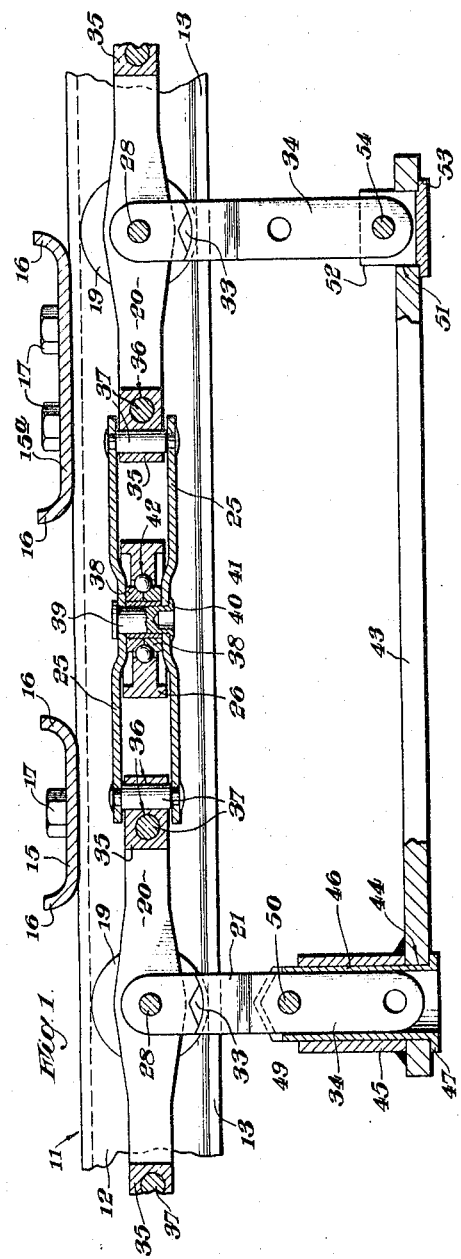
FIGURE 1 is an elevation, partly in section, of three links of a chain according to the invention.

Referring to the drawings, the track on which the chain is carried comprises a pair of track members 11 each having a central vertical web portion 12 and having its lower edge turned inwardly to form an inwardly projecting flange 13, so that the two members are very approximately of Z configuration. At intervals along the members 11 holes are provided in the upper flange to accommodate bolts by which spacer members 15 are attached. These spacer members have their edges 16 turned up and are held in position by bolts 17 secured by nuts 18. Two alternative forms of spacer members are shown in FIGURE 1, the one on the right being broader and having its web portion 15a secured by two bolts 17.

In operation the inner surfaces of the lower flanges 13 between them provide a track upon which the chain runs.

In FIGURE 3 the spacer members have been replaced by a flat plate 22 and fish plates 23 conforming to the section of the track are provided to cover a joint in the track.

The chain according to the invention consists of alternate carrier links and guide links, each carrier link being supported by a pair of wheels 19 which run upon the track formed by the inner surfaces of the flanges 13. The wheels 19 are carried on a spindle 28 which supports two flat bars 20 which comprise the carrier link. As may be seen from the right-hand portion of FIGURE 4 each of the wheels 19 is carried on a hub consisting of parts 29 and 30 which are attached to the adjacent links by spinning or peening over at 32 the flange of a bush 31, the bushes 31 being bored to accept the spindle 28. The contiguous circumferential edges of the hubs 29 and 30 are formed to a circular shape and the wheels 19 are formed to a corresponding internal circular shape, and the space defined by the shaping of these parts is filled with steel balls, so that the wheels 19 run on ball bearings. The pin 28 of each carrier link passes through a hole in a suspension link 21 which depends from the spindle 28 and carries the load which is attached to that particular link.

As may be seen from FIGURE 2 the suspension link 21 has a wide part at its upper end which lies between the bars comprising the link and is spaced centrally between them by the peened-over flanges 32 of the bushes 31.

Just below the bars 20 the suspension link is formed with two portions 33 which project on opposite sides and form stops. If the chain should be travelling with that particular link unloaded, and the chain passes to an incline, there is a possibility that the suspension link might swing back sufficiently far to foul the chain or chain sprockets. This is prevented by putting a stop on one or both sides of the link. For example there are illustrated projecting portions 33 which act as stops and strike the under faces of the bars 20. Below the projecting portions 33 the suspension link becomes narrower and there is a depending portion 34 which is identical in each carrier link.

The ends of the bars 20 are engaged by hinge blocks 35, each of which is provided with two bores 36 set at right-angles to each other, there being hinge pins 37 passing through the bores 36 which couple adjacent links together and at the same time provide universal joints. The pins 37 may be shouldered, as shown in the right-hand part of FIGURE 4, the smaller diameter portions passing through the bores 20, and the pins may be riveted over, or they may be provided with shallow heads at one end and retained by circlips at the other end.

The guide link between each two carrier links consists of two bars 25 which at their ends engage the hinge blocks 35 and are inwardly cranked or turned in at their central portions narrowing the space between the bars to abut a pair of hubs 38 which may be secured in position by means of a headed pin 39 rivted over at 40, at the end opposite to the head. A bush 41 may conveniently be placed between the pin 39 and the hubs 38. A wheel 26 arranged to rotate on the vertical axis of the pin 39 is of such diameter that it guides and locates the chain by making contact with the inner faces of the vertical webs 12 of the conveyor track 11. The inner diameter of the wheel 42 is formed to a radius so as to constitute a ball race and the contiguous circumferential edges of the hubs 38 are formed to a corresponding curve, the space formed being filled with steel balls during assembly.

The hinge blocks may have curved instead of the straight ends shown in FIGURES 1 and 4.

The inwardly cranked form of the bars 25 provides the advantage of compactness in the guide link, and enables the track to be built with a small depth as compared with existing track construction; for example, in the illustrated embodiment the depth is less than the width.

Where heavy loads are to be carried it is of advantage to be able to carry them on two carrier links so that the load is shared. Where this is required a coupling bar is employed comprising a yoke bar 43. This is provided with a bore 44 near one end and has a piece of tube 45 welded on to that end, in line with the bore 44. A bush 46 which is shown in pictorial form in FIGURE 5 is inserted from beneath, so that the bar 43 rests on a flange 47 provided at the lower end of the bush 45. The upper end of the bush 46 is closed by a cone 48 which is slotted at 49 to receive the suspension link 21. A pin 50 is pushed through holes in the bush 46 and in the suspension link and the coupling member is secured. At its other end the bar 43 is provided with a hole 51 through which a member 52 is inserted from beneath, so that the bar 43 rests on a flange 53 provided on the member 52. The upper part of the member 52 is formed as a clevis and the suspension link of the carrier link next to that engaged by the other end of the coupling is inserted in the clevis and secured by means of a pin 54, which passes through holes in the clevis and a hole in the suspension link and rests on the upper surface of the bar 43.

I claim:

1. A load-carrying chain conveyor comprising a U-shaped channel with a flat base longitudinally slotted in the middle providing co-planar flat tracks, a chain of load-carrying links alternating with connector links mounted to run within said channel, each load-carrying link being constructed of a pair of flat parallel link bars each of the same shape, said pair of link bars being symmetrical about a horizontal plane containing the axis of an axle pin which extends transversely between and through the flat link bars, a pair of load-carrying wheels rotatably mounted one on each end of the axle pin with the pair of flat link bars between the wheels which latter are adapted to engage said co-planar flat tracks, the flat link bars being spaced apart at each end by a transverse horizontal pivot pin on which is pivotally mounted a connector block which is pivotally connected to the adjacent end of a connector link by a vertical pivot pin, a load-supporting suspension member in the form of a single suspension bar with an enlarged head which is located by and between the pair of flat bars and is pivotal on the centre of the axle pin, the single suspension bar extending downwardly and freely through the slot between the tracks and being provided with stop means projecting outwardly from their sides adapted to engage the link bars of the respective carrier link if the suspension bars should tend to swing beyond a predetermined angle with respect to the line of movement of the chain.

2. A load-carrying chain conveyor comprising a U-shaped channel with a flat base longitudinally slotted in the middle providing co-planar flat tracks, a chain of load-carrying links alternating with connector links mounted to run within said channel, each load-carrying link being constructed of a pair of flat parallel link bars each of the same shape, said pair of link bars being symmetrical about a horizontal plane containing the axis of an axle pin which extends transversely between and through the flat link bars, a pair of load-carrying wheels rotatably mounted one on each end of the axle pin with the pair of flat link bars between the wheels which latter are adapted to engage said co-planar flat tracks, the flat link bars being spaced apart at each end by a transverse horizontal pivot pin on which is pivotally mounted a connector block which is pivotally connected to the adjacent end of a connector link by a vertical pivot pin, a load-supporting suspension member in the form of a single suspension bar with an enlarged head which is located by and between the pair of flat bars and is pivotal on the centre of the axle pin, the single suspension bar extending downwardly and freely through the slot between the tracks, a coupling bar adapted to engage the suspension link bars of two adjacent carrier links, each coupling bar comprising a yoke bar to carry the load, a tubular member attached to one end of the yoke bar, the yoke bar having a hole in line with the bore of the tube, a bush rotatable in the tubular member, and a pin passing laterally through the bush and the suspension link bar, the yoke bar being formed with a hole at its other end through which a clevis member is inserted and retained by a pin passing through the two sides of the clevis and the suspension link bar of the associated carrier link.

References Cited by the Examiner

UNITED STATES PATENTS

| 2,372,199 | 4/1945 | Hassler | 198—168 X |
| 2,490,682 | 12/1949 | Freeman | 198—177 |
| 2,768,733 | 10/1956 | Wilson | 198—177 |
| 3,006,456 | 10/1961 | Ferris et al. | 198—189 X |

FOREIGN PATENTS 917,597 2/1963 Great Britain.

EVON C. BLUNK, *Primary Examiner.*

HUGO O. SCHULZ, *Examiner.*

R. J. HICKEY, *Assistant Examiner.*